United States Patent [19]

Muhrer et al.

[11] Patent Number: 5,056,352
[45] Date of Patent: Oct. 15, 1991

[54] METHOD AND APPARATUS FOR GENERATING A PRECISELY DEFINED DYNAMIC PRESSURE PULSE

[75] Inventors: Gerhard Muhrer; Josef Riegebauer, both of Graz, Austria

[73] Assignee: AVL Gesellschaft fur Verbrennungskraft-maschinen und Messtechnik mbH., Prof. Dr. Dr. h.c. Hans List, Austria

[21] Appl. No.: 431,875

[22] Filed: Nov. 6, 1989

[30] Foreign Application Priority Data

Nov. 4, 1988 [AT] Austria ................................ 2715/88

[51] Int. Cl.$^5$ .............................................. G01L 27/00
[52] U.S. Cl. ................................................ 73/4 D; 73/37
[58] Field of Search ...................................... 73/4 D, 37

[56] References Cited

FOREIGN PATENT DOCUMENTS 3707565  9/1987  Fed. Rep. of Germany ....... 73/4 D
2187850  9/1987  United Kingdom ................. 73/4 D

*Primary Examiner*—Hezron E. Williams
*Assistant Examiner*—William Francos
*Attorney, Agent, or Firm*—Hill, Van Santen, Steadman & Simpson

[57] ABSTRACT

Method and apparatus for generating a precisely defined dynamic pressure pulse. A rigid pressure chamber contains a pressure transmission agent. The pressure chamber has a through opening in which is disposed a piston. A drop weight outside the pressure chamber coacts with the piston to generate a pressure pulse. The mass of the drop weight and the cross section of the piston, along with the chronological curve of acceleration of the drop weight during coaction with the piston, are used to generate a curve representing the pressure pulse. The curve satisfies the following equation:

$$p(t) = \frac{m \cdot a(t)}{A},$$

wherein:
m = mass of the drop weight;
a(t) = said acceleration curve; and
A = said cross sectional area of said piston.

8 Claims, 2 Drawing Sheets

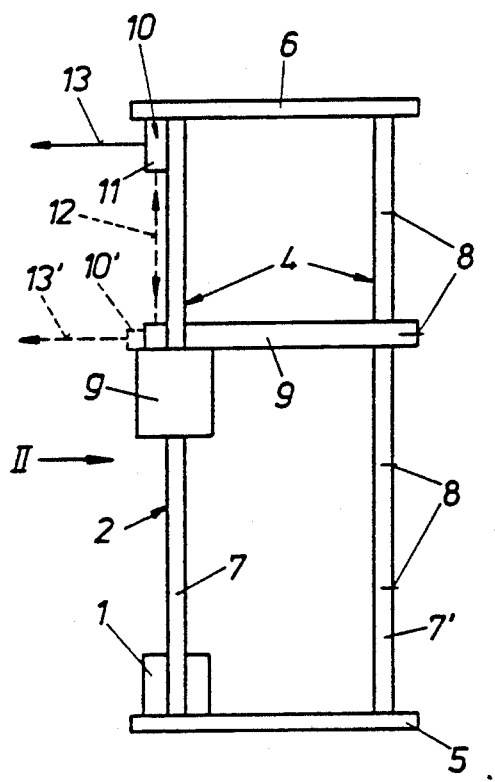
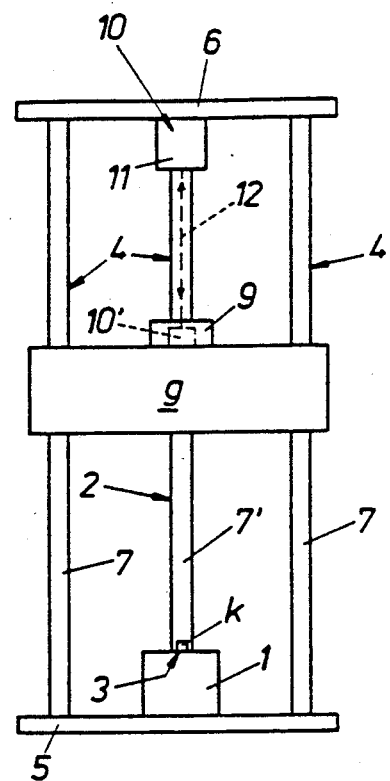
Fig. 1   Fig. 2
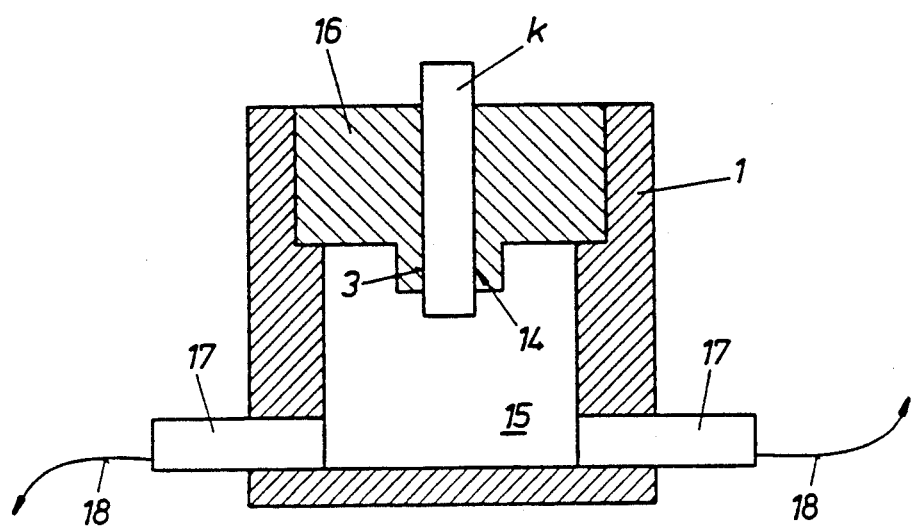
Fig. 3

METHOD AND APPARATUS FOR GENERATING A PRECISELY DEFINED DYNAMIC PRESSURE PULSE

TECHNICAL FIELD

The present invention is directed to a method and apparatus for generating a precisely defined dynamic pressure pulse having a duration and amplitude selectable within predetermined limits.

BACKGROUND OF THE INVENTION

Methods and apparatus are known which generate static (hydrostatic) pressure pulses, as well as dynamic (hydrodynamic) pressure pulses. However, such devices and methods are capable of describing only static pressure pulses with absolute mathematical precision. Difficulties have arisen in precisely mathematically describing dynamic or hydrodynamic pressure pulses (as particularly required, for example for the further development or calibration of piezoelectric pressure sensors that are employed in non-stationarily sequencing technical processes).

For example, German OS 37 07 565 discloses method and apparatus that at least theoretically generate a precisely defined dynamic pressure pulse. This method and apparatus employs a piston and drop weight to charge a pressure transmission medium in order to generate a pressure pulse, the chronological curve of which is ascertained. The relevant spring and damping characteristics of the pressure system are identified from the kinetic energy transmitted by the piston and from the above mentioned chronological curve. These characteristics are used to draw conclusions about the course of the absolute pressure pulse. However, in order to ascertain the chronological curve of the pressure pulse, the apparatus employs a pressure sensor of the very type that the apparatus is designed to calibrate. Since the pressure sensor influences the dynamic characteristics of the chronological curve of the pressure pulse, it inevitably introduces an undesirable level of uncertainty into this known method.

SUMMARY OF THE INVENTION

Therefore, it is an object of the present invention to provide a method and apparatus to generate a mathematically definable, precisely describable dynamic pressure pulse.

It is another object of the invention to provide a method and apparatus for the dynamic calibration of pressure sensors that is independent of the at least initially unknown dynamic characteristics of such pressure sensors, i.e. a method and apparatus whose dynamic characteristics are ascertainable without the use of pressure sensors.

These and other objects are achieved by providing a largely rigid pressure chamber that surrounds a pressure transmission agent. The pressure chamber includes a sealed through opening for a piston that is dynamically actuatable from outside the pressure chamber via a drop weight. Conclusions regarding the chronological curve of the absolute pressure pulse are made from individual measurements at the pressure system using a connected evaluation mechanism.

The chronological curve of the acceleration drop weight is identified during its coaction with the piston. Using this chronological curve in conjunction with measurements of the mass of the drop weight and the cross section of the piston, the curve of the absolute pressure pulse may be determined with mathematical precision.

The dynamic pressure curve of a gaseous or fluid medium which is charged with pressure in a closed measuring chamber and acted upon by a piston and drop mass, can be portrayed as the product of the compressibility of the medium and the penetration of the piston, dependent on time, divided by the cross sectional area of the piston. The compressibility of the medium (analogous to a type of spring constant) is at least in part dependent upon temperature and thus is, as a practical matter, extremely difficult to quantify. There are corresponding tabular values only for individual, pure agents. It is practically impossible to obtain compressibility values for other media, particularly for fluid mixtures typically used in generating high pressure pulses.

The product of the compressibility of the agent and the penetration path of the piston dependent on time during its coaction with the drop weight, corresponds to a force. This force can in turn be expressed as product of the mass of the drop weight and the acceleration or deceleration of the drop weight during its contact with the piston. Hence, given a predetermined piston cross section, by calculating the drop mass and the chronological curve of the acceleration of the drop weight during its coaction with the piston, one can determine the dynamic pressure curve with mathematical precision without the assistance of a pressure sensor.

It should be noted that the above method is actually based on a two mass resonator model, since certain spring and damping affects occur between the drop weight and the piston. Strict adherence to such a model would make the evaluation of the measurements and thus, the precise definition of the pressure pulse, extremely complicated. However, in the known method that was initially described, as well as in the method of the present invention, it has been shown that a very high degree of precision in mathematical description of the generated dynamic pressure pulses can be achieved with a single mass resonator model, as long as the ratio of the mass of the drop weight to the mass of the piston can be set approximately in the range of 100:1 and above. In a preferred embodiment of the present invention, this ratio is set at about 1000:1.

In a further embodiment of the method of the present invention, the absolute pressure pulse p(t) is calculated according to the following relationship:

$$p(t) = \frac{m \cdot a(t)}{A}.$$

wherein:
m = mass of the drop weight (g)
a(t) = curve of the acceleration of the drop weight (g) in interaction with the piston (k)
A = cross-sectional area of the piston (k).

The apparatus of the present invention includes a measuring arrangement having an acceleration measuring unit that generates measured signals to an evaluation system. These measured signals are dependent on the acceleration curve of the drop weight during its coaction with the piston. Acceleration measuring units that are capable of precisely measuring the chronological curve of acceleration are well known. The present invention also provides measuring equipment to determine the mass of the drop weight and the relevant cross section of the piston. Once measured, these quantities may be considered constants, and therefore have to be identified only once.

In another embodiment of the invention, the acceleration measuring unit includes an acceleration sensor, preferably a piezosensor, attached to the drop weight. Since such sensors, in contrast to pressure sensors, can also be dynamically calibrated on what are referred to as vibrating tables or similar arrangements, the chronological curve of the acceleration of the drop weight can thereby be simply and precisely calculated.

In contrast to direct measurement by an acceleration sensor, the acceleration may also be calculated by differentiation of a velocity timed curve of the drop weight. Any known method can be employed for the determination of the velocity timed curve itself. However, in a further preferred embodiment of the present invention, the velocity timed curve is calculated in "non-contact" fashion, preferably with laser velocimetry using the Doppler effect.

Commercially available laser velocimeters form a Doppler signal from an emitted beam. The beam is reflected at the test subject, and provides an extremely precise determination of the velocity of the test subject using the Doppler frequency of the emitted and reflected beams.

Other objects and advantages of the present invention will become apparent upon reference to the accompanying description when taken in conjunction with the following drawings.

BRIEF DESCRIPTION OF THE DRAWINGS

FIG. 1 is a side view of an apparatus embodying the present invention.

FIG. 2 is a front view of the apparatus indicated at arrow II of FIG. 1.

FIG. 3 is a sectional detail of a pressure chamber of the apparatus of FIGS. 1 and 2.

DESCRIPTION OF THE PREFERRED EMBODIMENTS

Figure 4:
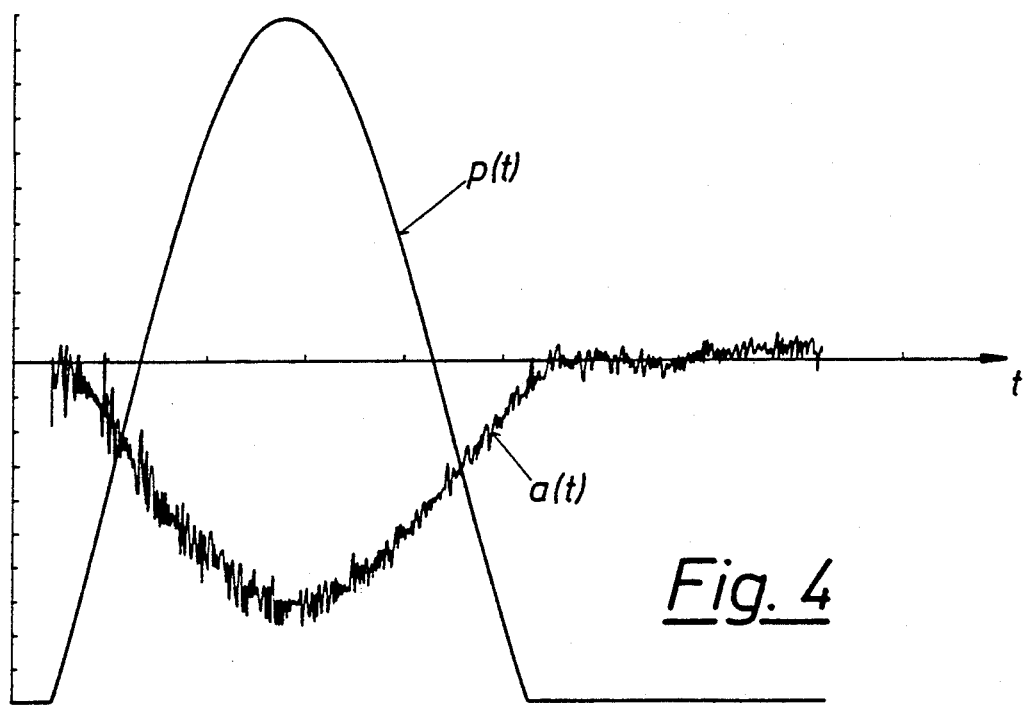
FIG. 4 shows the chronological curve of the acceleration a(t) and the curve of the corresponding pressure pulse p(t).

The apparatus of FIGS. 1 and 2 generate a precisely defined dynamic pressure pulse having a selectively variable duration and amplitude. The apparatus includes a generally rigid pressure chamber 1 that contains a pressure transmission agent (a gas, a gas mixture, or a fluid) enclosed by the pressure chamber. The apparatus also includes a compression mechanism 2 for dynamically compressing the pressure transmitting agent. A piston k is sealingly guided in a through opening 3 of the pressure chamber 1. A drop weight g having a predetermined mass m is mounted for vertical movement on a guide assembly 4 to dynamically actuate the piston k. The guide assembly 4 of the compression mechanism 2 includes two vertical columns or guide rails 7 that are mounted, with the pressure chamber 1, on a base plate 5 and are held at their upper ends by a cross head 6. A stand 7' is arranged between the base plate 5 and the cross head 6. The guide assembly 4 for the drop weight g can include low friction bearings (not shown) interacting with the guide rails 7 or with the stand 7'. Such bearings, for example self-centering air bearings, are used to reduce the friction generated by the relative motion between the drop weight g and the guide assembly 4. As may be seen in FIG. 1, predetermined initial positions for the drop weight g or for a drop weight holder 9, are defined at the rails 7 or at the stand 7'. In this embodiment, these positions occur at latches 8 that facilitate the observation of reproducible initial values. A holding and trigger mechanism (not shown) for the drop weight g can also be provided with the guide assembly 4.

FIGS. 1 and 2 show an acceleration measuring unit 10 arranged at the cross head 6. The acceleration measuring unit 10 includes a laser velocimeter 11 directed onto the drop weight g. A beam path 12 generated by the laser velocimeter 11 is shown in broken line. The acceleration measuring unit 10 is connected to an evaluation system (not shown) via a line 13. The evaluation system uses the curve of the velocity generated by the acceleration measuring unit 10, in conjunction with values representing the cross sectional dimension of the piston k and the mass of the drop weight g, to generate a mathematically precise description of the pressure pulse within the chamber 1 as described with reference to the following equation:

$$p(t) = \frac{m \cdot a(t)}{A},$$

wherein:
m = mass of the drop weight (g)
a(t) = curve of the acceleration of the drop weight (g) in interaction with the piston (k)
A = cross-sectional area of the piston (k)

As an alternative to the laser velocimeter 11, FIGS. 1 and 2 also shown an acceleration sensor 10' (in broken line) that is directly attached to the drop weight g. The acceleration sensor 10' can, for example, be formed by a piezosensor and directly enables a registration of the acceleration or deceleration of the drop weight g upon its coaction with the piston k. The acceleration measuring unit 10' may be connected to an evaluation system (not shown) via a line 13'.

FIG. 3 shows a detailed sectional view of the pressure chamber 1 having a low friction, pressure-compensated seal 14 between the piston k and the through opening 3. The seal 14 is concentric with the piston k, and includes an annular projection extending into the interior 15 of the pressure chamber 1 from the surface of an insert 16. The dimensions of the projection (i.e., its axial extent and inner and outer diameters) can be selected, along with the material of the insert 16, to provide a generally constant seal between the piston k and the opening 3. This enhanced seal occurs due to the fact that increasing pressure in the interior 15 of the pressure chamber 1 increases the radial forces biasing the projection 14 inwardly towards contact with the piston k.

As shown in FIG. 3, two pressure sensors 17 (for example piezoelectric sensors) are inserted at a lower side of the pressure chamber 1, and are connected via lines 18 to corresponding measuring equipment (not shown). The pressure sensor 17 can be dynamically calibrated with the precisely defined, dynamic pressure pulse generated by the apparatus of FIGS. 1 through 3. Note, however, that the dynamic pressure pulse generated with the illustrated equipment in the interior 15 of the pressure chamber 1 is not limited to the calibration of the pressure sensors. The pressure pulse can also be used for other purposes for which the exact knowledge of all relevant parameters of the pressure pulse is required.

The cure a(t) shown in FIG. 4 was generated with an acceleration sensor 10' attached to the drop weight g as shown in FIGS. 1 and 2. After reaching maximum deceleration (e.g., at the bottom of its travel), the elastic properties of the pressure transmission agent act through the piston k to accelerate the drop weight g in an upward direction. This acceleration and deceleration is expressed in the reversal of the a(t) curve. The highly zig-zag appearance of the a(t) curve in FIG. 4 is due to vibrations caused by the impact of the drop weight g on the piston k, of from slight flaws in the selection and attachment of the acceleration sensor 10' itself. Such minor fluctuations, however, can be easily filtered out or mathematically smoothed in the evaluation system.

The curve p(t) shown in FIG. 4 has been calculated from the curve a(t) according to the equation set forth hereinabove, taking into consideration the mass m of the drop weight g as well as the cross sectional area a of the piston k. Although it is obvious that the operational signs and the base lines of the two curves do not agree, it is equally clear that the maximums of both curves are coincident.

Figure 5:
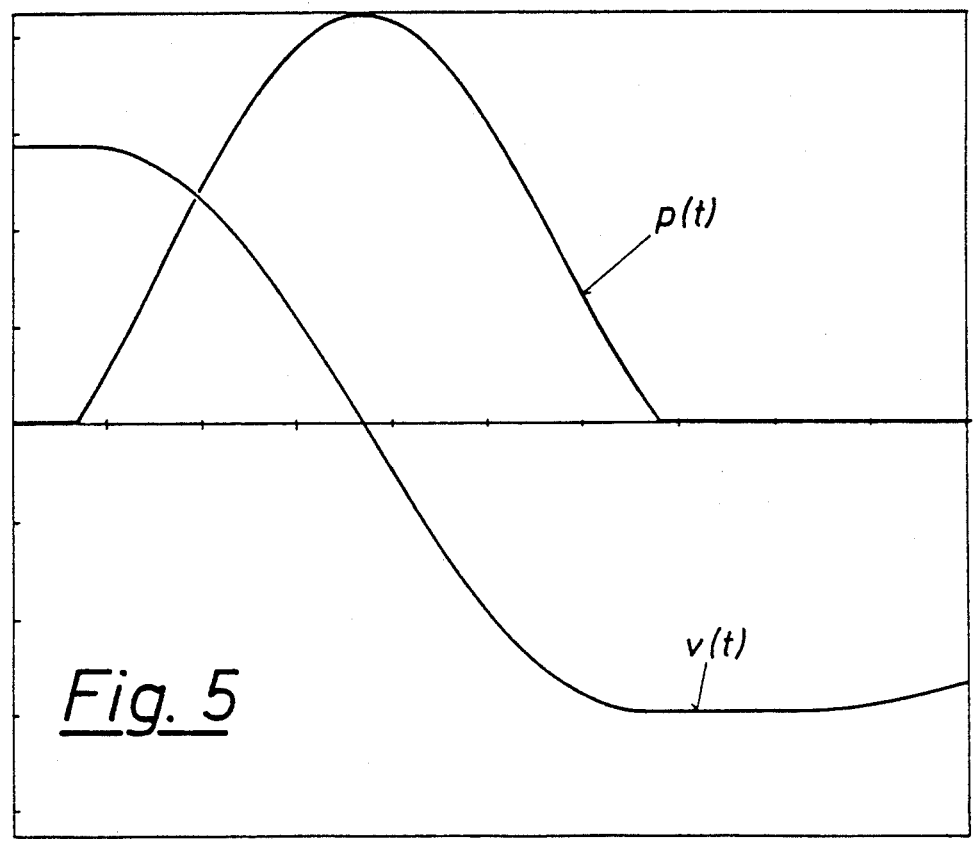
FIG. 5 shows the curve of the velocity v(t), and a corresponding pressure pulse curve p(t).

The velocity curve v(t) shown in FIG. 5 represents the output of the laser velocimeter 11 of FIGS. 1 and 2. By differentiating the function v(t), an acceleration curve a(t) is obtained that is similar to that shown in FIG. 4. This acceleration curve can then be used in the equation as described hereinabove, the result of which is the curve p(t) as shown in FIG. 5.

It is therefore clear that the method and apparatus of the present invention generate a precisely defined dynamic pressure pulse using relatively easily obtained information, while eliminating the use of a pressure sensor requiring initial calibration.

Although the present invention has been described with reference to embodiment, those of skill in the art will recognize that may be made thereto without departing from the scope and the invention as set forth in the appended claims.

We claim as our invention:

1. A method for generating a precisely defined dynamic pressure pulse curve having selectably predetermined duration and amplitude, said method comprising the following steps:

providing a substantially rigid pressure chamber containing a pressure transmission agent;

causing a drop weight to coact with a piston to compress said pressure transmission agent and generate a pressure pulse;

directly measuring acceleration of said drop weight during said coaction with said piston and generating a chronological curve of said acceleration;

quantifying the mass of said drop weight and the cross sectional area of said piston; and using said acceleration curve, said drop weight mass, and said piston cross section to generate a curve corresponding to said pressure pulse said drop weight has a predetermined mass;

said piston has a predetermined cross sectional area; and said curve corresponding to said pressure pulse obeys the following equations:

$$p(t) = \frac{m \cdot a(t)}{A}$$

wherein:
m = mass of the drop weight;
a(t) = said acceleration curve; and
A = said cross sectional area of said piston.

2. A method according to claim 1, further wherein said acceleration curve is identified with an acceleration sensor attached to said drop weight.

3. An apparatus for generating a precisely defined dynamic pressure pulse curve having selectably predetermined duration and amplitude, said apparatus comprising the following:

a substantially rigid pressure chamber containing a pressure transmission agent and having a sealed through opening;

a piston reciprocally disposed in said through opening;

drop weight means, outside said pressure chamber, for dynamically actuating said piston to generate a pressure pulse;

acceleration measuring means for directly measuring acceleration of said drop weight during actuation of said piston and for generating signals corresponding to said acceleration;

evaluation means for receiving said signals from said acceleration means and for using said signals to generate a curve corresponding to said pressure pulse;

said drop weight has a predetermined mass;

said piston has a predetermined cross sectional area; and said curve corresponding to the following equation;

$$p(t) = \frac{m \cdot a(t)}{A},$$

wherein:
m = mass of the drop weight;
a(t) = said acceleration curve; and
A = said cross sectional area of said piston.

4. An apparatus according to claim 3, further wherein said direct acceleration measuring means comprises an acceleration sensor attached to said drop weight.

5. An apparatus according to claim 4, further wherein said direct acceleration measuring means comprises a piezosensor.

6. An apparatus according to claim 3, wherein said pressure chamber further comprises means for attaching at least one pressure sensor for calibration thereof.

7. An apparatus for generating a precisely defined dynamic pressure pulse curve having selectably predetermined duration and amplitude, said apparatus comprising the following:

a substantially rigid pressure chamber containing a pressure transmission agent;

means for causing a drop weight to coact with a piston to compress said pressure transmission agent and generating a pressure pulse;

means for directly measuring acceleration of said drop weight during said coaction with said piston and generating a chronological curve of said acceleration;

measuring means for quantifying the mass of said drop weight and the cross sectional area of said piston; and evaluation means for using said acceleration curve, said drop weight mass, and said piston cross section to generate a curve corresponding to said pressure pulse said drop weight has a predetermined mass;

said piston has a predetermined cross sectional area; and said curve corresponding to said pressure pulse obeys the following equation:

$$p(t) = \frac{m \cdot a(t)}{A}$$

wherein:
m = mass of the drop weight;
a(t) = said acceleration curve; and
A = said cross sectional area of said piston.

8. A method according to claim 7, further wherein said direct acceleration measuring means comprises an acceleration sensor attached to said drop weight.

* * * * *